Figure 1:
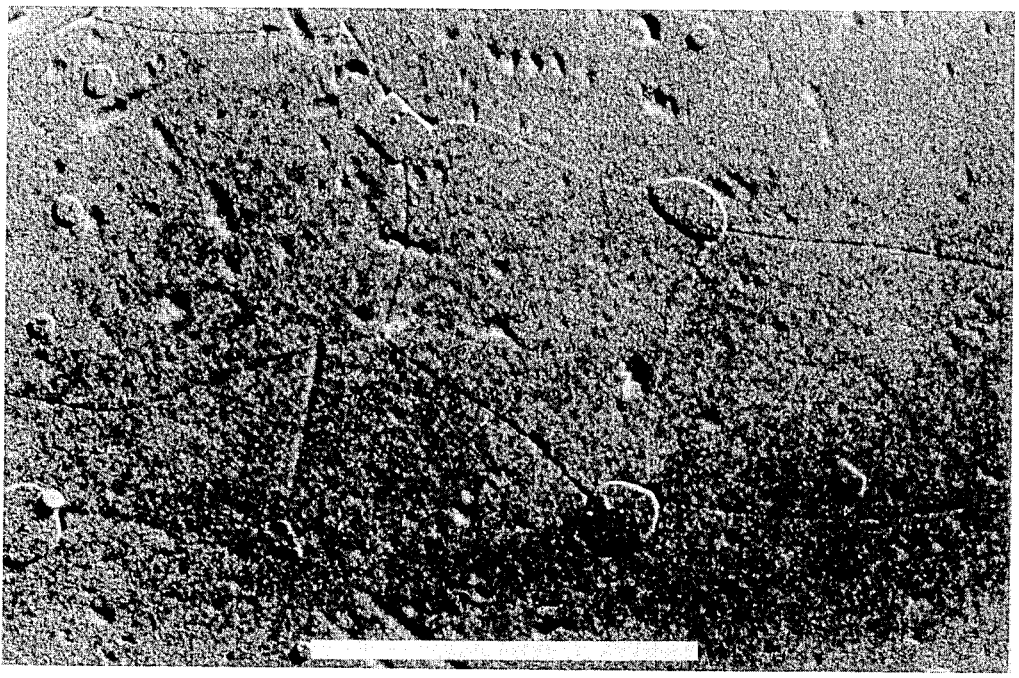

United States Patent
Reade

[11] 4,042,403
[45] Aug. 16, 1977

[54] THERMALLY STABLE GLASS-CERAMIC ARTICLES

[75] Inventor: Richard F. Reade, Corning, N.Y.

[73] Assignee: Corning Glass Works, Corning, N.Y.

[21] Appl. No.: 578,379

[22] Filed: May 19, 1975

[51] Int. Cl.² .......................... B26B 7/28; C03B 32/00
[52] U.S. Cl. .................................. 106/39.7; 106/39.8; 65/33
[58] Field of Search .................. 65/33; 106/39.8, 39.7

[56] References Cited

U.S. PATENT DOCUMENTS

| | | | |
|---|---|---|---|
| 3,241,985 | 3/1966 | Kuwayama | 65/33 X |
| 3,489,577 | 1/1970 | Tashiro et al. | 65/33 X |
| 3,582,371 | 6/1971 | Bruno et al. | 65/33 X |
| 3,804,608 | 4/1974 | Gaskel et al. | 65/33 |
| 3,871,852 | 3/1975 | Pei | 65/33 X |
| 3,901,676 | 8/1975 | Heinze et al. | 65/33 |
| 3,907,577 | 9/1975 | Kiefer | 65/33 |
| 3,951,670 | 4/1976 | Bush | 106/39.7 |
| 3,977,886 | 8/1976 | Muller | 106/39.8 |

Primary Examiner—S. Leon Bashore
Assistant Examiner—Frank W. Miga
Attorney, Agent, or Firm—Clinton S. Janes, Jr.; Clarence R. Patty, Jr.

[57] ABSTRACT

This invention relates to the production of glass-ceramic articles in the $Li_2O$—$MgO$—$Al_2O_3$—$SiO_2$ system nucleated with $TiO_2$, and, optionally, $ZrO_2$ which, containing beta-spodumene solid solution as the predominant crystal phase, exhibit average coefficients of thermal expansion over the range of 25°–1000° C. of less than about $15 \times 10^{-7}/°$ C. and total elongations after 2000 hours at 950° C. of less than about 1000 PPM. The compositions are especially useful in the manufacture of honeycomb structures which are to be subjected to extreme changes in temperature, such as are experienced in regenerative heat exchangers for use in turbine engines.

3 Claims, 2 Drawing Figures

THERMALLY STABLE GLASS-CERAMIC ARTICLES

The production of glass-ceramic articles is founded upon the controlled crystallization in situ of glass articles through the thermal treatment thereof. Thus, the production of glass-ceramic articles contemplates three general steps. First, a glass-forming batch, customarily containing a nucleating agent, is melted. Second, that melt is simultaneously cooled at a sufficiently rapid rate that no crystals are formed and a glass body of a desired configuration shaped therefrom. Third, the glass body is subjected to a specified heat treatment to cause the growth of crystals therein. In the common practice of glass-ceramic production, this third or crystallization step is divided into two parts. Hence, the glass body is initially heated to a temperature slightly above the transformation range to cause the development of nuclei in the glass body to provide sites for the subsequent growth of crystals. Thereafter, the body is heated to a higher temperature, frequently above the softening point of the glass, to cause the growth of crystals on the nuclei.

Since this crystallization in situ results through the substantially simultaneous growth on numberless nuclei, a glass-ceramic article normally consists of uniformly fine-grained crystals randomly-oriented, but homogeneously dispersed, throughout a residual glassy matrix. Customarily, a glass-ceramic article is highly crystalline, i.e., at least 50% by volume crystalline and frequently greater than 75% crystalline. This high crystallinity determines that the physical properties demonstrated by a glass-ceramic article are more closely akin to those of the crystals than to those of the glassy phase. And it is self-evident that the composition of, and consequently the physical properties of, the residual glass are quite different from those of the original or parent glass, inasmuch as the components making up the crystal phase will have been removed therefrom. Finally, the crystallization in situ underlying the formation of glass-ceramic articles results in such articles being free of voids and non-porous.

The field of glass-ceramics was grounded in U.S. Pat. No. 2,920,971 and reference is made to that patent for a more detailed description of the microstructure, physical properties, and the method of making such bodies.

U.S. Pat. No. 3,582,385 discloses glass compositions which can be drawn into fine-bore tubing useful in the fabrication of honeycomb-type structures. Upon heat treatment, the glasses were crystallized in situ to glass-ceramic tubing exhibiting excellent dimensional stability up to temperatures of about 800° C. Such glasses were composed, by weight, of about 3.5–5% $Li_2O$, 2.5–5% $BaO$, 15–21% $Al_2O_3$, 65–75% $SiO_2$, and 3.5–8% of a nucleating agent selected from the group consisting of 3–8% $TiO_2$ and 0–3% $ZrO_2$, the sum of $Li_2O$, $BaO$, $Al_2O_3$, $SiO_2$, $TiO_2$, and $ZrO_2$ constituting at least 98% of the total composition. The crystal phase consists principally of beta-spodumene solid solution ($Li_2O \cdot Al_2O_3 \cdot nSiO_2$) with a minor amount of celsian ($BaO \cdot Al_2O_3 \cdot 2SiO_2$). The patentees specifically pointed out that dimensional stability could only be achieved by eliminating oxides such as MgO, ZnO, and $B_2O_3$ which could form secondary crystal phases whose solid solubility with beta-spodumene varies as a function of temperature. Thus, where MgO is present, crystalline phases such as spinel ($MgO \cdot Al_2O_3$), cordierite ($2MgO \cdot 2Al_2O_3 \cdot 5SiO_2$), and cristobalite (a polymorph of silica) can develop during the crystallization treatment or, more importantly as far as dimensional stability is concerned, during subsequent prolonged exposures of the body to elevated temperatures. Cristobalite is a high expansion form of silica which frequently develops along with cordierite in thermally unstable, magnesia-containing, spodumene solid solution glass-ceramic articles. The density changes which may accompany the development of such phases will be reflected in overall dimensional instability of the article. Where such changes are sufficiently great, failure can occur. The combined growth of cordierite and cristobalite is especially undesirable and will produce elongations of several thousand parts per million (PPM) after relatively short exposure to a temperature of 950° C. Strain of that magnitude far exceeds the strain tolerance of such bodies in such structures as fine-bore honeycombs for heat exchanger applications. However, temperature of 950° C. were encountered in heat regenerative structures such that more dimensionally stable bodies were demanded than could be provided by the compositions of U.S. Pat. No. 3,582,385, supra.

Although the high temperature dimensional stability of the simple $Li_2O \cdot Al_2O_3 \cdot nSiO_2:TiO_2$ glass-ceramic bodies is excellent, such compositions are difficult to melt and form as glasses. Such glass bodies first develop crystals of beta-quartz solid solution as the crystallization treatment is begun, which are thereafter converted to beta-spodumene solid solution as the temperature of heat treatment is raised. Frequently, this initial crystallization to beta-quartz solid solution, which has a very low coefficient of thermal expansion, is so rapid that cracking of the body results. Therefore, various additions, e.g., BaO in U.S. Pat. No. 3,582,385 above, have been made to ameliorate those problems.

The principal object of the present invention is to provide a thermally crystallized glass composition that can be drawn into very thin-walled tubing and which, when crystallized in situ, will maintain integrity of shape while demonstrating excellent resistance to thermal shock, i.e., a coefficient of expansion over the range of room temperature (R.T.) to 1000° C. of less than 15 × $10^{-7}$/° C., and exceptional dimensional stability when exposed for long periods of time to temperatures up to 950° C.

I have discovered that this objective can be achieved by utilizing a very narrow range of base $Li_2O$—$Al_2O_3$—$SiO_2$ compositions nucleated with $TiO_2$, such that beta-spodumene solid solution comprises the predominant crystal phase, but wherein up to about one-third of the $Li_2O$ is replaced with MgO on a molar basis. This minor addition of MgO greatly improves the melting and forming capabilities of the base glass but does not cause the development of minor crystal phases during the crystallization heat treatment of the glass or even after very extended exposures of the crystallized articles to temperatures up to about 950° C. Where more than about one-third of the $Li_2O$ is replaced by MgO, cordierite and cristobalite are customarily developed leading to possible disruption of the body and certain loss of dimensional stability. At the one-third level, small compositional variations in the $Al_2O_3$ and $SiO_2$ constituents can affect the long term stability of the beta-spodumene solid solution. Thus, trace amounts of cordierite and cristobalite have been observed in such compositions after being subjected to 950° C. for 2000 hours. Laboratory experience has demonstrated that the glass-ceramic bodies of this invention will exhibit high temperature dimensional stability that equals and can even exceed that of the elementary $Li_2O \cdot Al_2O_3 \cdot nSiO_2 : TiO_2$ glass-ceramics.

Such compositions consist essentially, by weight on the oxide basis, of about 3-5% $Li_2O$, 0.25-2.5% MgO, 15-20% $Al_2O_3$, 68-75% $SiO_2$, and 2-5.5% $TiO_2$ with, optionally, up to about 3% $ZrO_2$ as a secondary nucleating agent. The molar ratio $Li_2O$:MgO will be at least 2:1. In general, the compositions of the invention will consist solely of those components other than conventional fining and coloring agents, if such are desired.

The process of the invention contemplates melting a batch for a glass within the above-outlined ranges of components. The melt is then simultaneously cooled to at least within the transformation range and a glass article of a desired geometry shaped therefrom. [The transformation range has been defined as the temperature at which a molten mass is transformed into an amorphous solid and is commonly considered to lie in the vicinity of the annealing point of a glass.] Thereafter, the glass article is heated to a temperature between about 1050°-1250° C. to cause crystallization in situ of beta-spodumene solid solution. In most instances, crystals of anatase and/or rutile, bimorphs of $TiO_2$, are also formed. The crystallization step will, preferably, be divided into an interval of nucleation followed by crystallization. Thus, common practice involves heating the glass article to between about 800°-950° C. to induce nucleation. This practice usually yields a glass-ceramic having more finely-grained crystallization and wherein the crystal size is more uniform.

These glasses nucleate quite quickly, so, particularly where thin-walled tubing is involved, nucleation periods of less than about 15 minutes can be very adequate. Much longer nucleation times can be successfully employed, e.g., 6-12 hours, and some crystallization may occur with such long dwell periods within the nucleation range. However, this practice is not looked upon favorably from a commercial point of view because the microstructure of the final produce is not substantially different from that secured with a shorter nucleation period. A practical maximum time for nucleation has been adjudged to be about 6 hours.

Likewise, the growth of crystals is quite rapid, especially at the upper extreme of the stated crystallization range. Hence, a highly crystalline body can be achieved in as brief a time as one hour. Nevertheless, to insure the greatest dimensional stability in the crystallized body, longer exposures will be employed to achieve essentially total crystallization. However, whereas much longer crystallization periods can be utilized, 24 hours has been considered a practical maximum length of exposure from a commercial point of view.

In the laboratory examples set out infra, the molten batches were shaped and cooled to room temperature to permit inspection of glass quality. Such practice is not required and, where speed in production and fuel economies are desired, the melts will be cooled to at least within, and preferably slightly below, the transformation range and then reheated to cause nucleation and crystallization. Moreover, whereas the laboratory heat treating schedules recorded below utilized specific dwell periods at specific temperatures, it will be appreciated that such practice is illustrative only and was undertaken as a matter of convenience. No hold periods per se are demanded; the only requirement being that the articles are exposed to temperatures within the 1050°-1250° C. interval.

Table I reports a group of thermally crystallizable glass compositions expressed in weight percent on the oxide basis. The actual batch ingredients can comprise any materials, either the oxides or other compounds, which, when melted together, are converted to the desired oxide compositions in the proper proportions. The MgO:$Li_2O$ substitution molar ratios for the compositions are also recorded as based upon the ternary. The batch ingredients were ballmilled for one hour to aid in securing a homogeneous melt and then placed into a platinum crucible. After covering, the crucibles were moved into a electrically-fired furnace operating at about 1550°-1675° C. and retained therein from about 16-24 hours. The melts were poured into steel plates, rolled into slabs about 10 × 4 × 0.5 inch, and the slabs immediately transferred to an annealer operating at 675° C. Glass bars about 4 × 1 × 0.5 inch were cut from the annealed slabs for exposure to the crystallization heat treatment.

TABLE I

|  | 1 | 2 | 3 | 4 | 5 | 6 | 7 |
|---|---|---|---|---|---|---|---|
| $SiO_2$ | 73.09% | 72.93% | 72.94% | 72.77% | 72.78% | 72.61% | 73.54% |
| $Al_2O_3$ | 17.09 | 17.05 | 17.05 | 17.01 | 17.02 | 16.98 | 16.16 |
| $Li_2O$ | 4.20 | 3.54 | 4.19 | 3.54 | 4.18 | 3.53 | 3.97 |
| MgO | 0.87 | 1.74 | 0.87 | 1.74 | 0.87 | 1.73 | 0.82 |
| $TiO_2$ | 4.75 | 4.74 | 4.74 | 4.73 | 4.72 | 4.72 | 5.31 |
| $ZrO_2$ | — | — | — | — | — | — | — |
| $As_2O_3$ | — | — | 0.21 | 0.21 | 0.43 | 0.43 | 0.20 |
| MgO:$Li_2O$ | 1.0:6.5 | 1.0:2.75 | 1.0:6.5 | 1.0:2.75 | 1.0:6.5 | 1.0:2.75 | 1.0:6.5 |

|  | 8 | 9 | 10 | 11 | 12 | Ternary |
|---|---|---|---|---|---|---|
| $SiO_2$ | 68.48% | 70.89% | 71.79% | 71.95% | 74.96% | 73.25% |
| $Al_2O_3$ | 20.01 | 18.33 | 17.99 | 18.03 | 15.17 | 17.13 |
| $Li_2O$ | 4.16 | 3.36 | 4.76 | 4.43 | 3.15 | 4.86 |
| MgO | 2.04 | 2.26 | 0.46 | 0.92 | 1.55 | — |
| $TiO_2$ | 5.06 | 4.94 | 5.00 | 2.19 | 4.98 | 4.76 |
| $ZrO_2$ | — | — | — | 2.25 | — | — |
| $As_2O_3$ | 0.25 | 0.22 | — | 0.23 | 0.19 | — |
| MgO:$Li_2O$ | 1.0:2.75 | 1.0:2.0 | 1.0:14.0 | 1.0:6.5 | 1.0:2.75 | |

Table II lists four different heat treatments in electrically-fired furnaces which were applied to glass bars formed from the compositions of Table I. As will be observed therein, each schedule involved heating the bar from room temperature (R.T.) to the nucleation hold at 300° C./hour. It will be appreciated that slower or more rapid temperature increases are operable where very thick or very thin bodies, respectively, are being treated. However, the 300° C./hour rate of increase has been considered to be satisfactory in the majority of instances in precluding breakage due to thermal shock.

Crystallization of the glass body proceeds more rapidly as the temperature is raised. Thus, the glass body is customarily raised to a temperature above its softening point to promote crystallization. However, a balance must be struck between the temperature rate at which the glass body approaches and exceeds the softening point thereof and the rate at which crystals are developing therein. Hence, in the first stages of crystallization, the proportion of crystals to glassy matrix is very low so the article will deform quite readily as the softening point of the glass is approached. Of course, the use of formers or other means of physical support can be employed to reduce this effect. Also, the use of a substantial nucleation period promotes more rapid crystal growth. In any event, the rate at which the temperature is raised will, preferably, balance the rate at which crystals are growing within the glass with the required degree of fluidity in the residual glass needed to avoid stress buildup and cracking. A heating rate of up to about 200° C. per hour from the nucleation range into the crystallization interval has yielded sound, substantially deformation-free bodies in most instances.

The rate at which the crystallized article can be cooled to room temperature is a function of its coefficient of thermal expansion and its thickness dimensions. Because of the very low coefficient of thermal expansion exhibited by the glass-ceramics of this invention, viz., between about $0-15 \times 10^{-7}/°$ C. over the range of R.T. to 1000° C., thin-walled articles can be simply removed from the furnace into the ambient environment. Merely as a matter of convenience, the crystallized bars were simply left in the furnace, the electric current thereto cut off, and the bars allowed to cool to room temperature at furnace rate, estimated to be about 3°–5° C./minute.

TABLE II

| Schedule No. | Heat Treatment |
|---|---|
| A | R.T. to 825° C. at 300° C./hour |
|  | Hold at 825° C. for 2 hours |
|  | 825° C. to 1000° C. at 50° C./hour |
|  | No hold at 1000° C. |
|  | 1000° C. to 1200° C. at 200° C./hour |
|  | Hold at 1200° C. for 16 hours |
| B | R.T. to 800° C. at 300° C./hour |
|  | Hold at 800° C. for 2 hours |
|  | 800° C. to 1000° C. at 67° C./hour |
|  | No hold at 1000° C. |
|  | 1000° C. to 1250° C. at 200° C./hour |
|  | Hold at 1250° C. for 16 hours |
| C | R.T. to 800° C. at 300° C./hour |
|  | Hold at 800° C. for 2 hours |
|  | 800° C. to 900° C. at 50° C./hour |
|  | No hold at 900° C. |
|  | 900° C. to 1250° C. at 200° C./hour |
|  | Hold at 1250° C. for 4 hours |
|  | 1250° C. to 1100° C. at 200° C./hour |
|  | Hold at 1100° C. for 12 hours |

TABLE II-continued

| Schedule No. | Heat Treatment |
|---|---|
| D | R.T. to 800° C. at 300° C./hour |
|  | Hold at 800° C. for 2 hours |
|  | 800° C. to 900° C. at 50° C./hour |
|  | No hold at 900° C. |
|  | 900° C. to 1250° C. at 200° C./hour |
|  | Hold at 1250° C. for 4 hours |
|  | 1250° C. to 900° C. at 200° C./hour |
|  | Hold at 900° C. for 2 hours |
|  | 900° C. to 1100° C. at 200° C./hour |
|  | Hold at 1100° C. for 10 hours |

Table III records the heat treatment schedule(s) applied to the bar samples of each example along with the crystal phases present identified through X-ray diffraction analysis and the coefficient of thermal expansion (R.T.-1000° C.), as determined in the conventional manner employing a differential dilatometer. In general, beta-spodumene solid solution (s.s.) comprised more than 90% of the total crystallinity. Replica electron micrographs indicated the final products to be very highly crystalline, viz., greater than 90% by volume crystalline, with the crystals being substantially all smaller than five microns in diameter and the great majority being less than one micron in diameter. All of the crystallized articles were densely opaque with a white-to-cream colored appearance.

The classic formula for beta-spodumene is $Li_2O \cdot Al_2O_3 \cdot 4SiO_2$. In the glass-ceramic articles of the instant invention, however, the composition of the crystal phase does not conform exactly to the classic formula. Rather, it is more in the nature of a solid solution corresponding generally to the formula $Li_2O \cdot Al_2O_3 \cdot nSiO_2$, where $n$ may vary from about 3.5–10, depending upon the silica content of the parent glass. There is evidence as well that such ions as magnesium and zinc may also appear in the crystal phase if included in the composition. Nevertheless, an X-ray diffraction analysis invariably produces a pattern characteristic of beta-spodumene. Therefore, that is the sense in which the expression "beta-spodumene solid solution" is used here.

TABLE III

| Example No. | Heat Treatment Schedule | Crystal Phases | Expansion ($\Delta L/L$ PPM) |
|---|---|---|---|
| 1 | A | Beta-spodumene s.s., Anatase | 567 |
| 1 | C | Beta-spodumene s.s., Anatase | — |
| 1 | D | Beta-spodumene s.s., Anatase | 558 |
| 2 | A | Beta-spodumene s.s., Anatase, Rutile | 701 |
| 2 | C | Beta-spodumene s.s., Anatase, Rutile | — |
| 2 | D | Beta-spodumene s.s., Anatase, Rutile | 714 |
| 3 | A | Beta-spodumene s.s., Anatase, Rutile | 458 |
| 4 | A | Beta-spodumene s.s., Rutile, Anatase | 474 |
| 5 | A | Beta-spodumene s.s., Anatase | 506 |
| 5 | C | Beta-spodumene s.s., Anatase | — |
| 6 | A | Beta-spodumene s.s., Rutile | 595 |
| 6 | C | Beta-spodumene s.s., Rutile | — |
| 6 | D | Beta-spodumene s.s., Rutile | 812 |
| 7 | C | Beta-spodumene s.s., Anatase | — |
| 8 | B | Beta-spodumene, Rutile, $Al_2TiO_5$ | — |
| 8 | C | Beta-spodumene, Rutile, $Al_2TiO_5$ | 969 |
| 9 | B | Beta-spodumene, Rutile, $Al_2TiO_5$ | 722 |
| 10 | B | Beta-spodumene, s.s., Anatase | 609 |
| 11 | B | Beta-spodumene s.s., $ZrTiO_4$ | 556 |
| 12 | B | Beta-spodumene s.s., Rutile | 464 |
| Ternary | A | Beta-spodumene s.s., Anatase | 360 |

No cristobalite or a magnesia-containing crystal phase such as spinel or cordierite was identified in any of the examples. Yet, all four of the heat treating schedules yielded significant amounts of cordierite and cristobalite when two-fifths of the $Li_2O$ was replaced with MgO on a molar basis.

Table IV records the crystal phases and the total dimensional changes after the exposure of several examples for 2000 hours at 950° C. In addition, Example 9 was fired at 1150° C. for 162 hours and no evidence of the development of a magnesia-containing phase or cristobalite was detected through X-ray diffraction analysis.

TABLE IV

| Example No. | Heat Treatment Schedule | Crystal Phases | Dimensional Change (ΔL/L PPM) |
|---|---|---|---|
| 1 | C | Beta-spodumene s.s., Anatase | −510 |
| 1 | D | Beta-spodumene s.s., Anatase | −318 |
| 2 | C | Beta-spodumene s.s, Rutile | −608 |
| 2 | D | Beta-spodumene s.s., Rutile | −216 |
| 4 | A | Beta-spodumene s.s., Rutile, Anatase | −101 |
| 5 | C | Beta-spodumene s.s., Rutile | −3 |
| 6 | C | Beta-spodumene s.s., Rutile | −722 |
| 6 | D | Beta-spodumene s.s., Rutile | −232 |
| 7 | C | Beta-spodumene s.s., Anatase | −384 |
| 8 | C | Beta-spodumene s.s., Rutile, $Al_2TiO_5$ | −271 |
| Ternary | A | Beta-spodumene s.s., Anatase | −537 |

It is apparent from an inspection of Table IV that several of the glass-ceramics of the present invention surpass the long term dimensional stability of the reference ternary ($Li_2O$—$Al_2O_3$—$SiO_2$) spodumene glass-ceramic. A comparison of heat treatment schedules C and D, applied to Examples 1, 2, and 6, clearly shows that an improvement in dimensional stability can be attained through variations in the crystallization heat treatment.

Although the mechanism through which the substitution of MgO for $Li_2O$ operates to improve the high temperature, long term stability of the crystallized articles is not understood, its function in enhancing the melting and forming capabilities of the single ternary system is believed to be explained below.

Hence, as can be seen in Table V, infra, the mole-for-mole substitution of MgO for $Li_2O$ reduces the glass liquidus temperature without softening the glass. This phenomenon causes the viscosity of the glass at the liquidus to be effectively increased. And, it is recognized that a higher liquidus viscosity helps in avoiding unwanted devitrification during the forming process since it permits the formation of intricate shapes at a more favorable lower temperature-higher viscosity condition. The compositions of Examples 1, 2, and the Ternary listed in Table V are reported in terms of moles, rather than the weight percents of Table I, such that the molar substitution of MgO for $Li_2O$ can be observed. The softening point (° C.), annealing point (° C.), strain point (° C.), coefficient of thermal expansion over the temperature range of 0°–300° C. ($\times 10^{-7}$ per ° C.), density (g/cc), liquidus (° C.), and the viscosity at the liquidus (poises) were determined in accordance with conventional measuring techniques.

TABLE V

|  | Ternary | 1 | 2 |
|---|---|---|---|
| $SiO_2$ | 56.25 | 56.25 | 56.25 |
| $Al_2O_3$ | 7.75 | 7.75 | 7.75 |
| $TiO_2$ | 2.75 | 2.75 | 2.75 |
| $Li_2O$ | 7.50 | 6.50 | 5.50 |
| MgO | — | 1.00 | 2.00 |

TABLE V-continued

|  | Ternary | 1 | 2 |
|---|---|---|---|
| Softening | 969 | 974 | 969 |
| Annealing | 695 | 696 | 697 |
| Strain | 643 | 647 | 648 |
| Expansion | 41.6 | 37.7 | 34.2 |
| Density | 2.346 | 2.356 | 2.365 |
| Liquidus | 1,337 | 1,315 | 1,292 |
| Viscosity | 17,400 | 30,200 | 34,700 |

Figure 2:
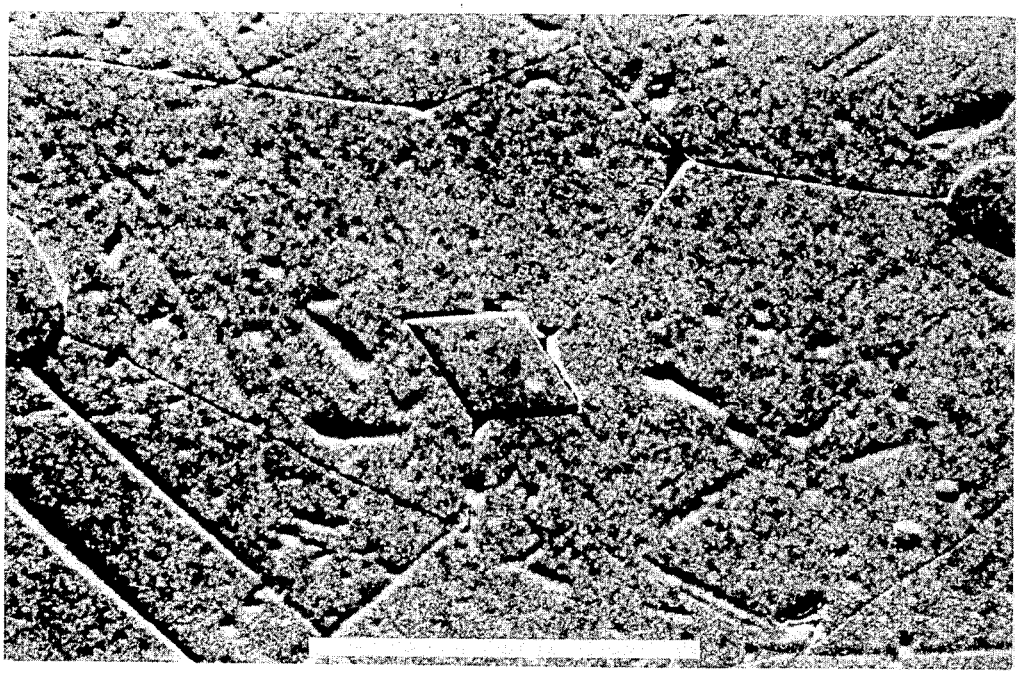

FIG. 1 is a replica electron micrograph illustrating the microstructure of Example 2 crystallized in accordance with Schedule A of Table II. FIG. 2 is a replica electron micrograph depicting the microstructure of Example 3 also crystallized in accordance with Schedule A of Table II. The white bar at the base of each photomicrograph represents a distance of 1 micron.

I claim:

1. A method for making a glass-ceramic article exhibiting an average coefficient of thermal expansion (R.T. to 1000° C.) between about 0–15 $\times$ $10^{-7}$/° C. and a change in length of less than about 1000 PPM after an exposure of 2000 hours to temperatures up to 950° C. consisting essentially of a fine-grained crystal phase uniformly dispersed within a glassy matrix, said crystal phase being essentially free from cristobalite, cordierite, and spinel and consisting essentially of beta-spodumene solid solution, said crystals constituting at least 90% by volume of the article which comprises:
   a. melting a batch for a glass consisting essentially, by weight on the oxide basis, of about 3–5% $Li_2O$, 0.25–2.5% MgO, 15–20% $Al_2O_3$, 68–75% $SiO_2$, and 2–5.5% $TiO_2$, wherein the molar ratio of $Li_2O$:MgO is at least 2:1;
   b. simultaneously cooling the melt to at least within the transformation range and shaping a glass article of a desired configuration therefrom;
   c. heating said glass article to a temperature between about 1050°–1250° C. to cause the crystallization in situ of beta-spodumene solid solution crystals; and then
   d. cooling the crystallized article to room temperature.

2. A method according to claim 1 wherein said glass article is heated to a temperature between about 800°–950° C. to cause nucleation prior to heating to about 1050°–1250° C.

3. A glass-ceramic article made in accordance with the method of claim 1.

* * * * *

UNITED STATES PATENT AND TRADEMARK OFFICE
CERTIFICATE OF CORRECTION

PATENT NO. : 4,042,403
DATED : August 16, 1977
INVENTOR(S) : Richard F. Reade

It is certified that error appears in the above-identified patent and that said Letters Patent are hereby corrected as shown below:

Column 2, line 18, "temperature" should be -- temperatures --.

Column 3, line 57, "produce" should be -- product --.

Column 4, line 29, "a" should be -- an --.

Column 5, line 24, "$10^{116}\ 7/°C.$" should be -- $10^{-7}/°C.$ --.

Signed and Sealed this

Third Day of October 1978

[SEAL]

Attest:

RUTH C. MASON
Attesting Officer

DONALD W. BANNER
Commissioner of Patents and Trademarks